United States Patent
Wang

(10) Patent No.: US 11,753,506 B2
(45) Date of Patent: Sep. 12, 2023

(54) POLYIMIDE THIN FILM, PREPARING METHOD THEREOF, AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Yamin Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 587 days.

(21) Appl. No.: 16/966,063

(22) PCT Filed: Mar. 17, 2020

(86) PCT No.: PCT/CN2020/079573
§ 371 (c)(1),
(2) Date: Jul. 30, 2020

(87) PCT Pub. No.: WO2021/120427
PCT Pub. Date: Jun. 24, 2021

(65) Prior Publication Data
US 2023/0151155 A1    May 18, 2023

(30) Foreign Application Priority Data
Dec. 18, 2019    (CN) .......................... 201911311792.3

(51) Int. Cl.
*C08G 73/16* (2006.01)
*C08G 73/10* (2006.01)
*C08J 5/18* (2006.01)

(52) U.S. Cl.
CPC ............ *C08G 73/1067* (2013.01); *C08J 5/18* (2013.01); *C08J 2379/08* (2013.01)

(58) Field of Classification Search
CPC .......................... C08G 73/16; C08G 63/6854
See application file for complete search history.

(56) References Cited

U.S. PATENT DOCUMENTS

| 2004/0038054 A1* | 2/2004 | Wang ..................... C08G 73/16 |
| | | 428/473.5 |
| 2009/0306329 A1 | 12/2009 | Hasegawa |

FOREIGN PATENT DOCUMENTS

| CN | 101580637 A | 11/2009 |
| CN | 102725679 A | 10/2012 |
| CN | 104016950 A | 9/2014 |
| CN | 109251315 A | 1/2019 |
| CN | 110317339 A | 10/2019 |
| JP | 2008297354 A | 12/2008 |
| WO | WO 201705050541 | * 3/2017 |

OTHER PUBLICATIONS

USPTO structure search, Apr. 2023.*
Polymer☐Hasegawa, Masatoshi, Etc. Optically transparent aromatic poly(ester imide)s with lowcoefficients ofthermal expansion (1). Self-orientation behavior during, solution casting process and substitutent effect, Polymer, vol. 74, pp. 1-15,Sep. 2015.

* cited by examiner

*Primary Examiner* — Gregory Listvoyb
(74) *Attorney, Agent, or Firm* — PV IP PC; Wei Te Chung; Zhigang Ma

(57) ABSTRACT

The present disclosure provides a polyimide thin film, a preparing method thereof, and a display device. Specifically, a polyamic acid containing an ester group structure is prepared. The polyamic acid is prepared by a two-step process. A dianhydride containing an ester group structure is introduced into a polyimide to increase the content of benzene ring. Moreover, the introduction of ester groups is conducive to flexibility, which not only improves its heat resistance component, but, by introducing components with longer flexible chains, effectively destroys the regularity of macromolecules, thereby improving the flexibility of the material. Moreover, the introduction of rigid aromatic ring groups facilitates the realization of heat resistance. The ester bond is introduced into the dianhydride through the esterification, and then participates in the preparing of the polyimide material.

10 Claims, 4 Drawing Sheets

POLYIMIDE THIN FILM, PREPARING METHOD THEREOF, AND DISPLAY DEVICE

FIELD OF INVENTION

The present disclosure relates to the field of display technologies, and More Particularly, to a Polyimide Thin Film, a Preparing Method Thereof and a display device.

BACKGROUND OF INVENTION

In China, it is inclined to use optically transparent heat-resistant polyimide materials as flexible organic light-emitting diode (OLED) substrate materials. However, it is difficult to obtain high levels of comprehensive performances, i.e., optical transparency, heat resistance, dimensional stability (thermal dimensional stability) in the thermal cycle in the equipment preparing process, and film flexibility etc. Thus, on the current stage of the OLED field, its flexible performance has become hard to be achieved.

Technical Problems

Plastic substrate materials are superior to current inorganic glass substrates in terms of flexibility and film formability, but have poor heat resistance and thermal dimensional stability. Thus, it is extremely necessary to improve the heat resistance of the flexible substrate materials.

SUMMARY OF INVENTION

Technical Solutions

An object of the present disclosure is to provide a polyimide thin film, a preparing method thereof, and a display device, which can effectively improve the heat resistance and deformation resistance of the polyimide thin film.

In order to solve the above technical problems, the present disclosure provides a polyimide thin film, having a structural formula of:

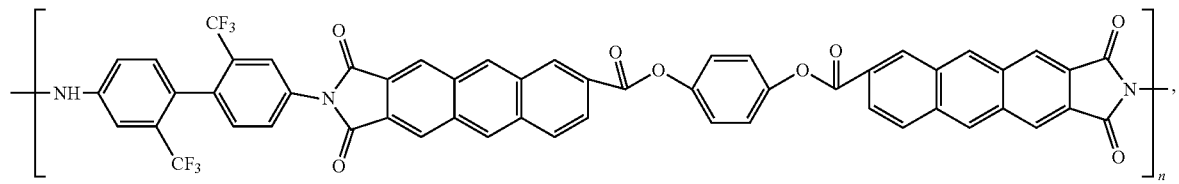

wherein a value of n ranges from 1000 to 3500.

The invention further provides a method of preparing a polyimide thin film, comprising steps of: preparing a first compound having a dianhydride structure; adding the first compound and a first solvent into a first flask protected by argon, to fully dissolve the first compound in the first solvent; adding a second compound having a fluorodiamine structure into the first flask, continuously stirring at a room temperature, and fully reacting for 24 to 96 hours to obtain a polyamic acid containing an ester group structure; adding a second solvent into the polyamic acid, heating to 150 to 250° C. under an argon atmosphere, and fully reacting for 4 to 6 hours to obtain a first mixed solution; filtering the first mixed solution using an organic filter to obtain a filtrate, and spin-coating the obtained filtrate on a glass substrate; maintaining a temperature of 50 to 100° C. for 0.5 to 1 hours under vacuum, to remove the first solvent from the filtrate; baking the filtrate on the glass substrate to form a thin film, immersing the entire glass substrate and the thin film in deionized water for 72 to 96 hours, and then peeling off the thin film from the glass substrate; and taking the thin film out, and vacuum-drying the thin film at 80° C. again to obtain the polyimide thin film.

Further, in the step of preparing the first compound having the dianhydride structure includes steps of: providing 1,2,4-anthracenetricarboxylic acid anhydride chloride and phenol; adding the 1,2,4-anthracenetricarboxylic acid anhydride chloride, the phenol, and a catalyst into a second flask, and continuously stirring to dissolve; heating the second flask to 40 to 60° C., fully reacting for 3 to 9 hours, and cooling to form a second mixed solution; adding anhydrous ethanol into the second mixed solution to wash 4 to 6 times, suction filtering to obtain a filtered cake, and drying the filtered cake in a vacuum drying box at 50 to 100° C. for 24 to 48 hours to obtain the first compound.

Further, the first compound includes a bis-anthracene-tetracarboxylic acid dianhydride derivative, the first solvent includes N-methylpyrrolidone, the second compound includes a diamine monomer, and the second solvent includes toluene.

Further, the molar ratio of the first compound to the second compound ranges from 1:3 to 3:1.

Further, the catalyst includes N, N-dimethylformamide, and the phenol includes phenyl group; and in the step of adding the 1,2,4-anthracenetricarboxylic acid anhydride chloride, the phenol, and the catalyst into the second flask, a stirring speed ranges from 200 ppm to 340 ppm.

Further, a molar ratio of the 1,2,4-anthracenetricarboxylic acid anhydride chloride and the phenol ranges from 1:2 to 1:1.

The present disclosure further provides a display device, comprising the polyimide thin film.

Further, the display device comprises: a flexible substrate, wherein material of the flexible substrate is the polyimide thin film; and a display panel provided on the flexible substrate.

Further, the display panel is an OLED display panel.

Beneficial Effect:

The present disclosure provides a polyimide thin film, a preparing method thereof, and a display device. Specifically, a polyamic acid containing an ester group structure is prepared. The polyamic acid is prepared by a two-step process. First, a dianhydride containing an ester group structure is introduced into a polyimide to increase the content of benzene ring. Moreover, the introduction of ester groups is conducive to flexibility, which not only improves its heat resistance component, but by introducing components with longer flexible chains, effectively destroys the regularity of macromolecules, thereby improving the flexibility of the material. Moreover, the introduction of rigid aromatic ring groups facilitates the realization of heat resistance. The ester bond is introduced into the dianhydride through the esterification, and then participates in the preparing of the polyimide material.

DESCRIPTION OF DRAWINGS

With reference to the accompanying drawings, the technical solutions and other beneficial effects of the present disclosure will be apparent through the detailed description of the specific examples of the present disclosure.

Figure 1:
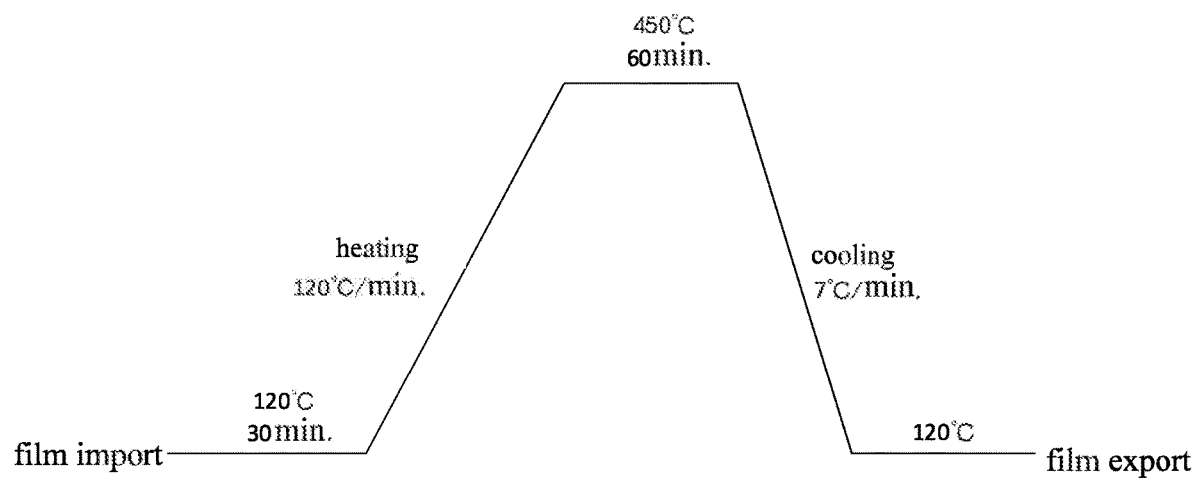
FIG. 1 is a graph of the baking temperature of a polyimide thin film provided by example 1 of the present disclosure.

display device 10;

flexible substrate 11; display panel 10.

DETAILED DESCRIPTION OF PREFERRED EMBODIMENTS

The present disclosure provides a polyimide thin film, a preparing method thereof, and a display device. In order to make the purpose, technical solutions, and effects of the present disclosure clearer and more definite, the present disclosure will be further described in detail below with reference to the accompanying drawings and examples. It should be understood that the specific examples described herein are merely used to explain the present disclosure, and are not used to limit the present disclosure.

The present disclosure provides a polyimide thin film, having a structural formula of:

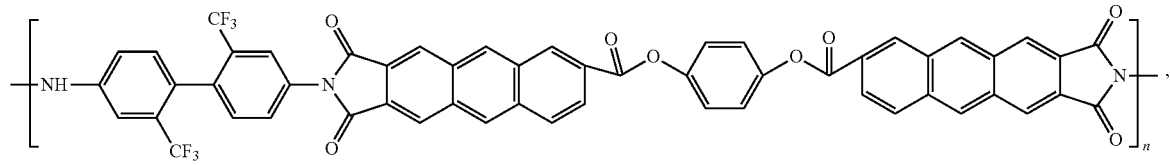

wherein a value of n ranges from 1000 to 3500, and the corresponding molecular weight of the polyimide thin film ranges from 200,000 to 400 million.

In order to explain the present disclosure more clearly, the polyimide thin film will be further explained in combination with a method of preparing a polyimide thin film of the present disclosure.

In an example of the present disclosure, taking the prepare of a target compound (a polyimide thin film of the present disclosure) as an example, the method of preparing the polyimide thin film of the present disclosure is described in detail.

The method of preparing the electrochromic polyamic acid material of the present disclosure includes the following steps of S1-S8:

(S1) preparing a first compound having a dianhydride structure. Specifically, the step of preparing the first compound having the dianhydride structure includes steps of S11-S14.

(S11) providing 1,2,4-anthracenetricarboxylic acid anhydride chloride and phenol. The phenol includes phenyl group, and can also be replaced by any one of the molecular structural formulas of the following compounds. The following molecular formula does not show the diol structure on both sides.

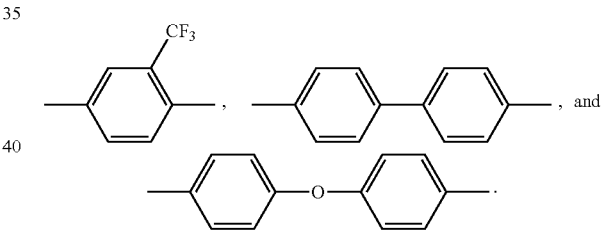

(S12) adding the 1,2,4-anthracenetricarboxylic acid anhydride chloride, the phenol, and a catalyst into a second flask, and continuously stirring to dissolve.

(S13) heating the second flask to 50 to 100° C., fully reacting for 3 to 9 hours, and cooling to form a second mixed solution; and (S14) adding anhydrous ethanol into the second mixed solution to wash 4 to 6 times, suction filtering to obtain a filtered cake, and drying the filtered cake in a vacuum drying box at 50 to 100° C. for 24 to 48 hours to obtain the first compound with a structural formula as follows:

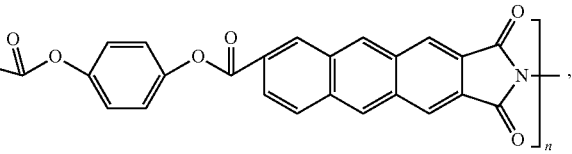

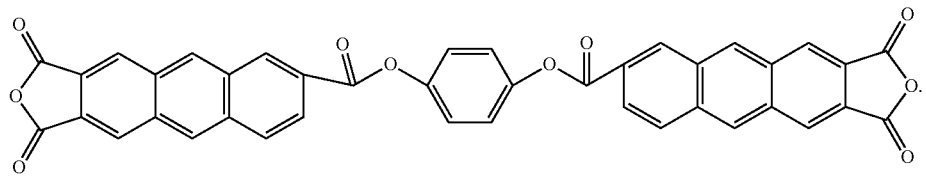 [SMILES: O=C(Oc1ccc(OC(=O)c2ccc3cc4cc5c(cc4cc3c2)C(=O)OC5=O)cc1)c1ccc2cc3cc4c(cc3cc2c1)C(=O)OC4=O]

(S2) adding the first compound and a first solvent into a first flask protected by argon, to fully dissolve the first compound in the first solvent;

(S3) adding a second compound having a fluorodiamine structure into the first flask, continuously stirring at a room temperature, and fully reacting for 24 to 96 hours to obtain a polyamic acid containing an ester group structure with a structural formula as follows:

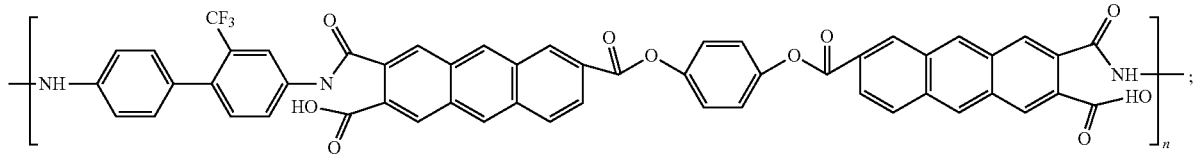

(S4) adding a second solvent into the polyamic acid, heating to 150 to 250° C. under an argon atmosphere, and fully reacting for 4 to 6 hours to obtain a first mixed solution;

(S5) filtering the first mixed solution using an organic filter to obtain a filtrate, and spin-coating the obtained filtrate on a glass substrate;

(S6) maintaining a temperature of 80° C. for 0.5 to 1 hours under vacuum, to remove the first solvent from the filtrate;

(S7) baking the filtrate on the glass substrate to form a thin film, immersing the entire glass substrate and the thin film in deionized water for 72 to 96 hours, and then peeling off the thin film from the glass substrate; and (S8) taking the thin film out, and vacuum-drying the thin film at 80° C. again to obtain the polyimide thin film.

Figure 2:
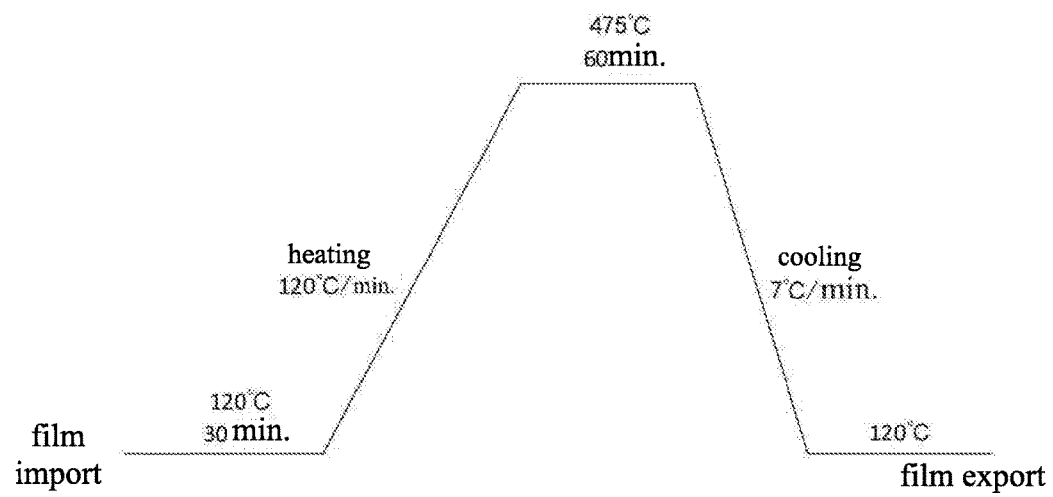
FIG. 2 is a graph of the baking temperature of a polyimide thin film provided by example 2 of the present disclosure.

Specifically, in the method of preparing the polyimide thin film, the crosslinking process of the polyimide thin film lasts for 3-5 hours, the heating rate ranges from 4 to 10° C./min, and the maximum temperature ranges from 420° C. to 500° C. The baking stage includes hard baking and soft baking. The hard baking refers to directly heating up to the maximum temperature and maintaining the temperature for about 1 hour, and then cooling, as shown in FIG. 1 and FIG. 2. The difference between the example in FIG. 1 and that in FIG. 2 is the maximum temperature. The maximum temperature in the example in FIG. 1 is 450° C., while the maximum temperature in the example in FIG. 2 is 475° C.

Figure 3:
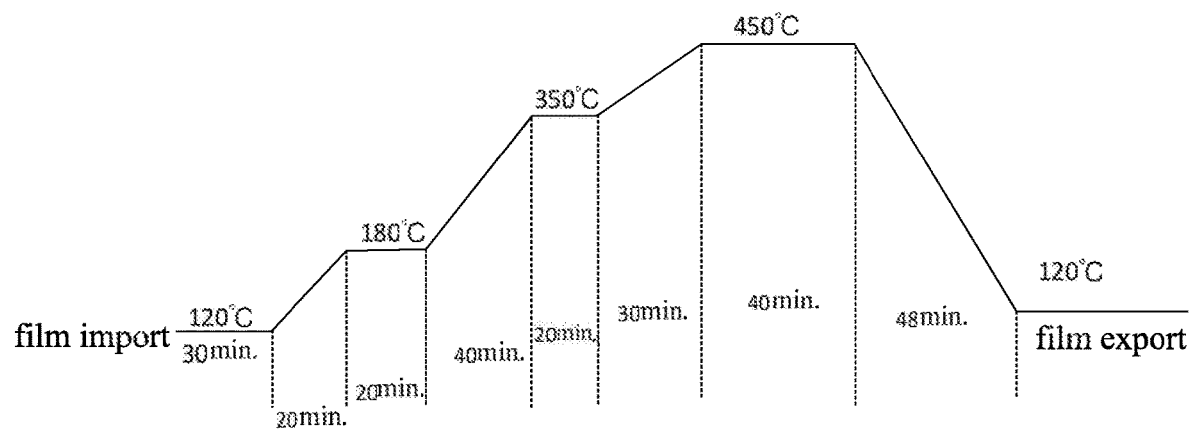
FIG. 3 is a graph of the baking temperature of a polyimide thin film provided by example 3 of the present disclosure.
Figure 4:
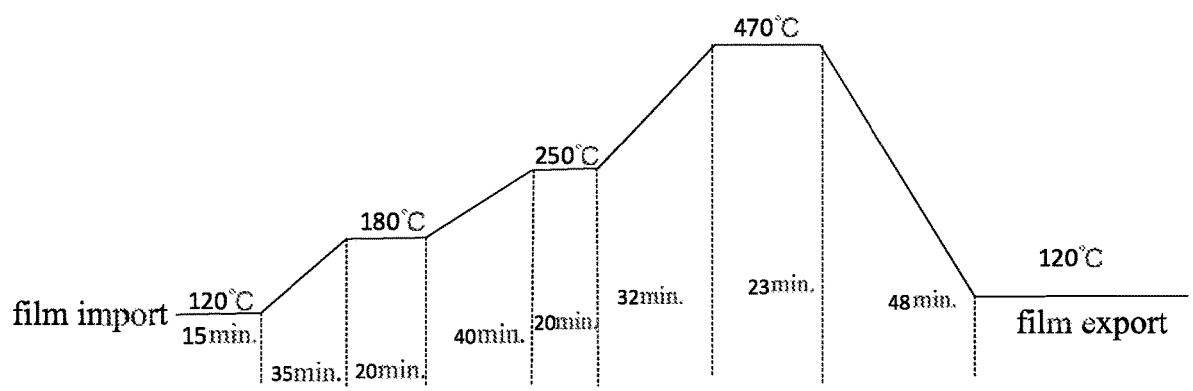
FIG. 4 is a graph of the baking temperature of a polyimide thin film provided by example 4 of the present disclosure.

The soft baking includes a step of passing through a thermal control platform 2 or more times, and finally cooling. FIG. 3 and FIG. 4 show the processes including passing through the thermal control platform three times. In an example in FIG. 3, a temperature is respectively maintained at 180° C. for 20 minutes, at 250° C. for 20 minutes, and at 450° C. for 40 minutes. In an example in FIG. 4, a temperature is respectively maintained at 180° C. for 25 minutes, at 250° C. for 20 minutes, and at 470° C. for 23 minutes.

By the control of different temperatures of the soft and hard baking, the material is cross-linked and the solvent is removed at different constant temperature stages. The method used in the present disclosure includes, but is not limited to, the baking methods and time intervals in FIGS. 1-4.

In order to further elaborate the performance of the polyimide thin film, the present disclosure simply tests the polyimide thin film.

Figure 5:
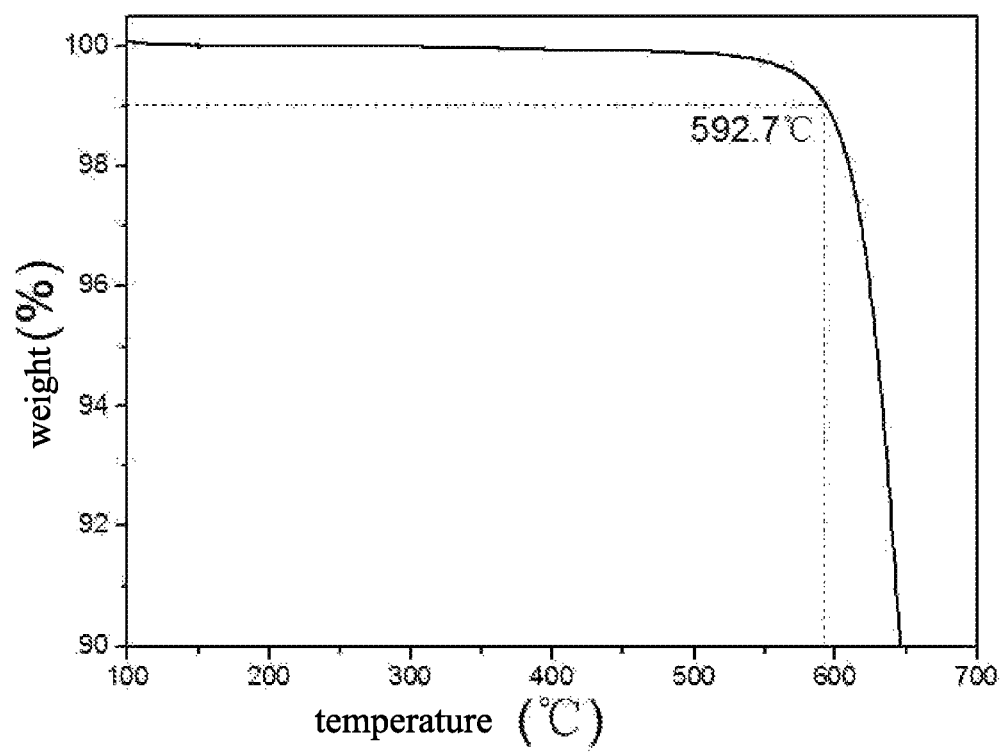
FIG. 5 is a graph of weightlessness of a polyimide thin film prepared by the present disclosure.
Figure 6:
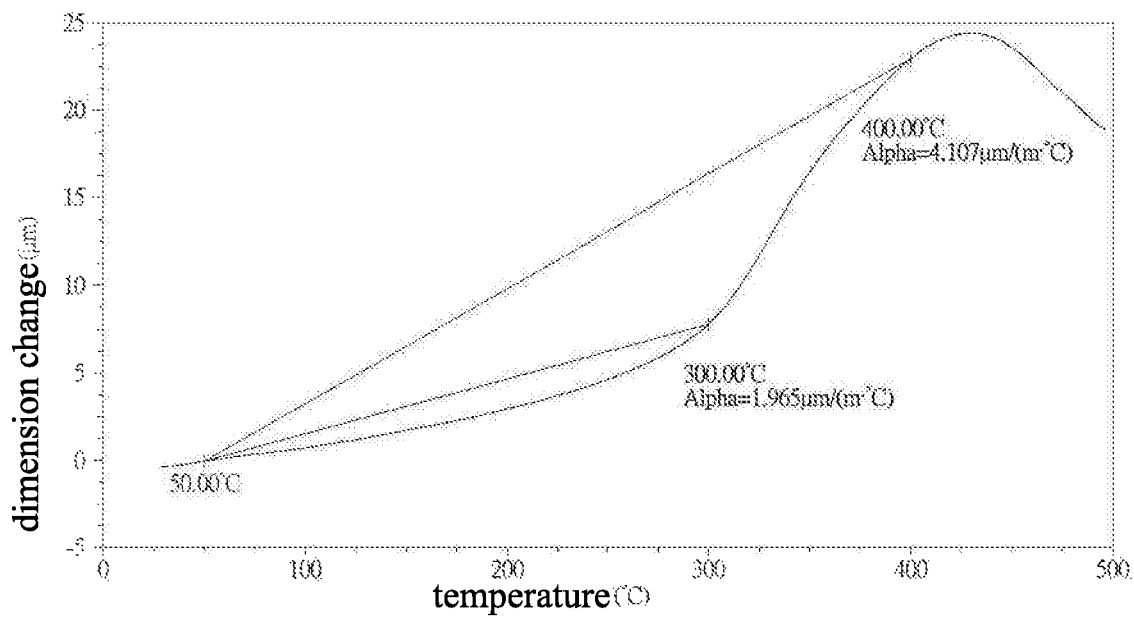
FIG. 6 is a fluorescence spectrum of the electrochromic polyamic acid material of the present disclosure in N, N'-dimethylacetamide solution.

As shown in FIG. 5, due to the introduction of large aromatic ring and ester structure, the polyimide thin film prepared by using the polyamic acid containing an ester group as a monomer unit has a weight loss of 1% mass and a temperature of about 590° C., which is beneficial in the use of materials in the current OLED field. As shown in FIG. 6, it can be seen that the polyimide thin film of the present disclosure has good thermal stability with the deformation rate at 50-350° C. less than 2 ppm/K, thereby providing an idea for using in the stacked structure with inorganic materials, especially providing a solution for being OLED substrate material withstanding heating and cooling in multiple processes.

Experiments show that the polyimide thin film has high heat resistance and flexibility. In order to apply the polyimide thin film to a light-emitting device, the present disclosure also provides a display device including the polyimide thin film.

Figure 7:
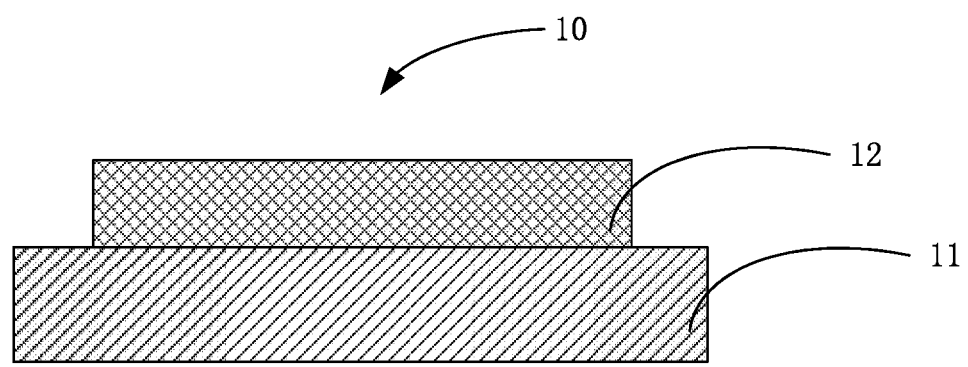
FIG. 7 is a schematic structural diagram of a display device of the present disclosure.

Specifically, as shown in FIG. 7, the display device includes: a flexible substrate and a display panel. The material of the flexible substrate is a polyimide thin film. The display panel is provided on the flexible substrate. The display panel is an OLED display panel.

The flexible substrate of the display device provided in this example has thermal stability and flexibility, which improves the stability of the display device.

The present disclosure provides a polyimide thin film, a preparing method thereof, and a display device. Specifically, a polyamic acid containing an ester group structure is prepared. The polyamic acid is prepared by a two-step process. First, a dianhydride containing an ester group structure is introduced into a polyimide to increase the content of benzene ring. Moreover, the introduction of ester groups is conducive to flexibility, which not only improves its heat resistance component, but, by introducing components with longer flexible chains, effectively destroys the regularity of macromolecules, thereby improving the flexibility of the material. Moreover, the introduction of rigid aromatic ring groups facilitates the realization of heat resistance. The ester bond is introduced into the dianhydride through the esterification, and then participates in the preparing of the polyimide material.

It can be appreciated by those ordinarily skilled in the art that equivalent replacements or changes can be made according to the technical solutions and inventive concepts of the present disclosure, while all such changes or replacements should be encompassed by the protection scope of the appended claims of the present disclosure.

What is claimed is:

1. A polyimide thin film, having a structural formula of:

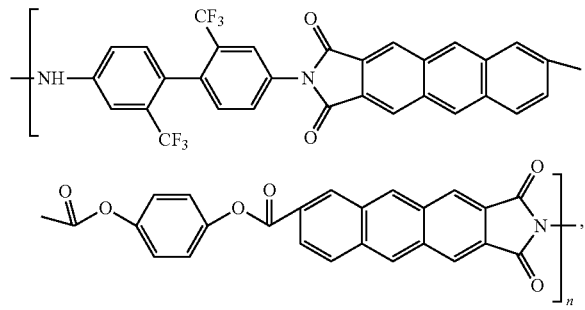

wherein a value of n ranges from 1000 to 3500.

2. A method for preparing a polyimide film of claim 1, comprising steps of:
preparing a first compound having a dianhydride structure;
adding the first compound and a first solvent into a first flask protected by argon, to fully dissolve the first compound in the first solvent;
adding a second compound having a fluorodiamine structure into the first flask, continuously stirring at a room temperature, and fully reacting for 24 to 96 hours to obtain a polyamic acid containing an ester group structure;
adding a second solvent into the polyamic acid, heating to 150 to 250° C. under an argon atmosphere, and fully reacting for 4 to 6 hours to obtain a first mixed solution;
filtering the first mixed solution using an organic filter to obtain a filtrate, and spin-coating the obtained filtrate on a glass substrate;
maintaining a temperature of 50 to 100° C. for 0.5 to 1 hours under vacuum, to remove the first solvent from the filtrate;
baking the filtrate on the glass substrate to form a thin film, immersing the entire glass substrate and the thin film in deionized water for 72 to 96 hours, and then peeling off the thin film from the glass substrate; and taking the thin film out, and vacuum-drying the thin film at 50 to 100° C. again to obtain the polyimide thin film.

3. The method of preparing the polyimide thin film of claim 2, wherein the step of preparing the first compound having the dianhydride structure includes steps of:
providing 1,2,4-anthracenetricarboxylic acid anhydride chloride and phenol;
adding the 1,2,4-anthracenetricarboxylic acid anhydride chloride, the phenol, and a catalyst into a second flask, and continuously stirring to dissolve;
heating the second flask to 40 to 60° C., fully reacting for 3 to 9 hours, and cooling to form a second mixed solution;
adding anhydrous ethanol into the second mixed solution to wash 4 to 6 times, suction filtering to obtain a filtered cake, and drying the filtered cake in a vacuum drying box at 50 to 100° C. for 24 to 48 hours to obtain the first compound.

4. The method of preparing the polyimide thin film of claim 2, wherein the first compound includes a bis-anthracene-tetracarboxylic acid dianhydride derivative, the first solvent includes N-methylpyrrolidone, the second compound includes a diamine monomer, and the second solvent includes toluene.

5. The method of preparing the polyimide thin film of claim 2, wherein the molar ratio of the first compound to the second compound ranges from 1:3 to 3:1.

6. The method of preparing the polyimide thin film of claim 3, wherein the catalyst includes N, N-dimethylformamide, and the phenol includes phenyl group; and wherein in the step of adding the 1,2,4-anthracenetricarboxylic acid anhydride chloride, the phenol, and the catalyst into the second flask, a stirring speed ranges from 200 ppm to 340 ppm.

7. The method of preparing the polyimide thin film of claim 3, wherein a molar ratio of the 1,2,4-anthracenetricarboxylic acid anhydride chloride and the phenol ranges from 1:2 to 1:1.

8. A display device, comprising: the polyimide thin film according to claim 1.

9. The display device of claim 8, wherein the display device comprises:
a flexible substrate, wherein material of the flexible substrate is the polyimide thin film; and
a display panel provided on the flexible substrate.

10. The display device of claim 9, wherein the display panel is an OLED display panel.

* * * * *